US012469930B2

(12) United States Patent
Narayan et al.

(10) Patent No.: US 12,469,930 B2
(45) Date of Patent: Nov. 11, 2025

(54) LONG-LIFE LITHIUM-SULFUR BATTERY USING A NOVEL FLEXIBLE BI-LAYER SOLID STATE ELECTROLYTE

(71) Applicant: UNIVERSITY OF SOUTHERN CALIFORNIA, Los Angeles, CA (US)

(72) Inventors: Sri Narayan, Los Angeles, CA (US); Rodrigo Elizalde-Segovia, Los Angeles, CA (US); Buddhinie Jayathilake, Los Angeles, CA (US); Ahmed Irshad Maniyanganam, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 870 days.

(21) Appl. No.: 17/613,873

(22) PCT Filed: May 26, 2020

(86) PCT No.: PCT/US2020/034497
§ 371 (c)(1),
(2) Date: Nov. 23, 2021

(87) PCT Pub. No.: WO2020/243066
PCT Pub. Date: Dec. 3, 2020

(65) Prior Publication Data
US 2022/0247039 A1    Aug. 4, 2022

Related U.S. Application Data

(60) Provisional application No. 62/852,951, filed on May 24, 2019.

(51) Int. Cl.
*H01M 50/449*  (2021.01)
*H01M 4/40*  (2006.01)
(Continued)

(52) U.S. Cl.
CPC ......... *H01M 50/449* (2021.01); *H01M 4/405* (2013.01); *H01M 4/525* (2013.01);
(Continued)

(58) Field of Classification Search
CPC .... H01M 50/451; H01M 4/405; H01M 4/525; H01M 4/5825; H01M 4/622;
(Continued)

(56) References Cited

U.S. PATENT DOCUMENTS 5,571,634 A * 11/1996 Gozdz ................. H01M 50/446
429/223
8,105,717 B2 * 1/2012 Skotheim .............. H01M 4/625
429/231.95
(Continued)

FOREIGN PATENT DOCUMENTS

KR    20180051716 A  *  5/2018
WO    2014/003825 A1    1/2014

OTHER PUBLICATIONS

Derek Moy and S. R. Narayanan, "Mixed Conduction Membranes Suppress the Polysulfide Shuttle in Lithium-Sulfur Batteries", Jan. 27, 2017, J. Electrochem. Soc., 164, A560, DOI: 10.1149/2.0181704jes (Year: 2017).*

(Continued)

*Primary Examiner* — Nicholas A Smith
*Assistant Examiner* — Ziheng Lu
(74) *Attorney, Agent, or Firm* — Brooks Kushman P.C.

(57) ABSTRACT

A lithium-sulfur battery cell includes a cathode that includes sulfur, an anode that includes lithium metal; and a bilayer membrane interposed between the cathode and the anode. The bilayer membrane includes a mixed conduction membrane layer and a lithium ion-conducting polymer electrolyte layer where the lithium ion-conducting layer is interposed between the mixed conduction membrane layer and the anode.

11 Claims, 12 Drawing Sheets

(51) Int. Cl.
| | |
|---|---|
| *H01M 4/525* | (2010.01) |
| *H01M 4/58* | (2010.01) |
| *H01M 4/62* | (2006.01) |
| *H01M 10/0525* | (2010.01) |
| *H01M 10/0565* | (2010.01) |
| *H01M 10/0585* | (2010.01) |
| *H01M 50/414* | (2021.01) |
| *H01M 50/451* | (2021.01) |

(52) U.S. Cl.
CPC ......... *H01M 4/5825* (2013.01); *H01M 4/622* (2013.01); *H01M 10/0525* (2013.01); *H01M 10/0565* (2013.01); *H01M 10/0585* (2013.01); *H01M 50/414* (2021.01); *H01M 50/451* (2021.01); *H01M 2300/0082* (2013.01)

(58) Field of Classification Search
CPC ......... H01M 10/0525; H01M 10/0565; H01M 10/0585; H01M 50/414; H01M 2300/0082
See application file for complete search history.

(56) References Cited

U.S. PATENT DOCUMENTS

| | | | |
|---|---|---|---|
| 2012/0094188 A1 | 4/2012 | Visco et al. | |
| 2013/0026409 A1* | 1/2013 | Baker | H01G 11/64 |
| | | | 429/479 |
| 2014/0377627 A1 | 12/2014 | Furuya et al. | |
| 2017/0033400 A1* | 2/2017 | Eitouni | H01M 4/1397 |
| 2018/0159171 A1 | 6/2018 | Narayan et al. | |
| 2018/0233746 A1* | 8/2018 | Yura | H01M 10/0562 |
| 2018/0358598 A1* | 12/2018 | Craig | H01M 50/449 |
| 2019/0123343 A1* | 4/2019 | Drews | H01M 4/62 |

OTHER PUBLICATIONS

Conlin, "Mechanism of mixed conductivity in crystalline and amorphous lithium lanthanum titanate", 2022, Solid State Ionics, 386, https://doi.org/10.1016/j.ssi.2022.116029 (Year: 2022).*

Yang, "Composite Polymer Electrolytes with Li7La3Zr2O12 Garnet-Type Nanowires as Ceramic Fillers: Mechanism of Conductivity Enhancement and Role of Doping and Morphology", 2017, Applied Materials & Interfaces, 21773-21780, DOI: 10.1021/acsami.7b03806 (Year: 2017).*

Int'l Search Report and Written Opinion for PCT Appn. PCT/US2020/034497 filed May 26, 20, 11 pgs.

* cited by examiner

LONG-LIFE LITHIUM-SULFUR BATTERY USING A NOVEL FLEXIBLE BI-LAYER SOLID STATE ELECTROLYTE

CROSS-REFERENCE TO RELATED APPLICATIONS

This application is the U.S. national phase of PCT Appln. No. PCT/US2020/034497 filed May 26, 2020, which claims the benefit of U.S. provisional Ser. No. 62/852,951 filed May 24, 2019, the disclosures of which are hereby incorporated in their entirety by reference herein.

TECHNICAL FIELD

In at least one aspect, the present invention is related to lithium-sulfur electrochemical cells with reduced polysulfide shuttling.

BACKGROUND

Rechargeable lithium-sulfur batteries have attracted interest for high-density electrical energy storage because of their high theoretical specific energy of 2600 Wh/kg and the relatively low cost of sulfur. FIG. 1 provides a schematic of a prior art lithium-sulfur battery, Despite this promise, deployment of these batteries have be limited by a short cycle life caused at least in part by shuttling of soluble polysulfides between the two electrodes. As depicted in FIG. 2A, Moy and Narayanan have demonstrated the use of mixed conduction membranes to suppress the polysulfide shuttle [1].

Moreover, dense mixed conduction membranes fabricated with lithiated cobalt oxide (LCO) and PVDF binder are flexible and thin (15-50 microns) (see, FIG. 2B). The effectiveness of this novel mixed conduction membranes layer has been demonstrated to not only suppress shuttling of polysulfides but also to improve capacity retention during repeated cycling and to preserve rate capability and impedance of the lithium-sulfur battery (FIG. 2C). Although this solution works reasonably well additional improvement is necessary.

Accordingly, there is a need for improved lithium-sulfur batteries with increased cycle life and inhibition of the polysulfide shuttle.

SUMMARY

In at least one aspect, the present invention addresses the principal challenge of rechargeability and energy density of lithium-sulfur batteries by using innovative solid-state membrane concepts. Specifically, the challenges from the polysulfide redox shuttle and lithium dendrites are overcome by using an innovative a "flexible bi-layer solid-state electrolyte separator".

In another aspect, a lithium-sulfur battery cell includes a cathode that includes sulfur, an anode that includes lithium metal; and a bilayer membrane interposed between the cathode and the anode. The bilayer membrane includes a mixed conduction membrane layer and a lithium ion-conducting polymer electrolyte layer where the lithium ion-conducting layer is interposed between the mixed conduction membrane layer and the anode.

In another aspect, a flexible bi-layer membrane separator is provided. The flexible bi-layer membrane separator can include one layer to block the transport of polysulfides beyond the zone of the sulfur cathode while still conducting lithium ions and a second layer to serve as the polymeric electrolyte against the lithium metal anode thereby avoiding the need for liquid electrolyte at the anode. Such a hi-layer separator will be placed in direct contact with the lithium anode, without liquid electrolyte. Moreover, a porous separator can be avoided. The avoidance of liquid electrolyte at the lithium anode prevents the growth of lithium dendrites in addition to minimizing the total amount of liquid electrolyte in the cell. The new cell configuration can use manufacturing techniques similar to that used in the lithium-ion battery industry, allowing pouch, prismatic or spirally-wound cells to be manufactured. The new bilayer separator membrane in a pouch cell will remove the principal barriers to the commercialization of a long-life lithium-sulfur battery with specific energy >350 Wh/kg and cycle life over 1000 cycles.

In another aspect, a bilayer is used as an electrolyte in conjunction with a lithium intercalating solid-state electrolyte incorporated into the sulfur electrode. The lithium intercalation material that provides the lithium ion source replaces the use of liquid electrolyte in the sulfur electrode. In this regard, lithium cobalt oxide $LiCoO_2$ or another lithiated transition metal oxide can be applied as the intercalating material.

In another aspect, a non-flammable solid-state Li—S battery that can operate at room temperature is provided. Moreover, the Li—S battery cell has reduced or no gas evolution due to electrolyte decomposition or additive such as $LiNO_3$.

In another aspect, a lithium-sulfur battery having superior cell rechargeability with the polysulfide shuttle being blocked is provided.

In another aspect, a lithium-sulfur battery having a polymer layer that blocks growth of lithium dendrites is provided. Therefore, the battery call can avoid dendritic shorting.

In another aspect, a lithium-sulfur battery having a mixed conducting intercalation layer that enhances the ion transport, does not contribute to the cell's resistance and provides higher energy efficiency with improved rate capability (i.e., high power) is provided.

In another aspect, a cathode for a lithium-sulfur battery is provided. The cathode including sulfur, carbon particles, and lithium intercalation particles supported on the carbon particles. The interaction particles selected from the group consisting of intercalation nanoparticles, intercalation microparticles, and combinations thereof. Characteristically, at least a portion of the sulfur is interdispersed within spaces in a network formed by the carbon particles and the intercalation particles.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein:

FIG. 1. Schematic representation of the intercalating bilayer solid-state lithium-sulfur battery. The Bilayer is made of an ion intercalating material and a polymer electrolyte. The polymer electrolyte layer is in contact with the lithium electrode and the intercalation layer in contact with the sulfur electrode. Notice that the intercalation material is also incorporated into the sulfur electrode to allow the ion transport replacing any source of liquid electrolyte.

DETAILED DESCRIPTION

Figure 1:
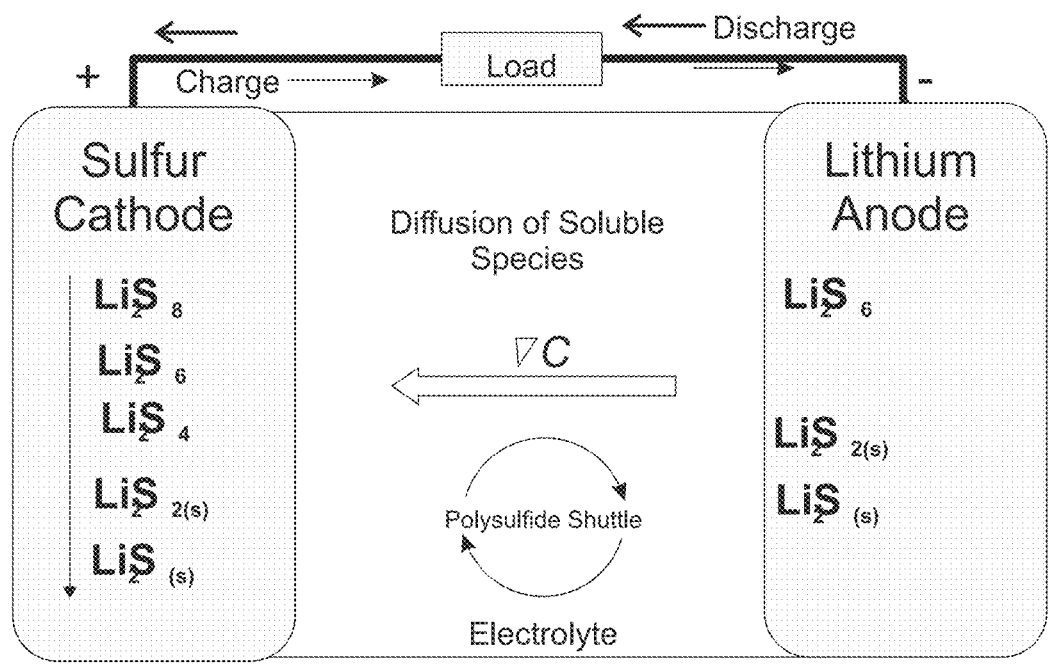
FIG. 1. Lithium-Sulfur Battery and related chemistry.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "comprising." Typically, this phrase is used to denote that an object is formed from a material.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term. "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term "substantially free" means that the component described as substantially free is present in an amount of less than 0.5 weight percent, 0.1 weight percent, 0.05 weight percent, or 0.01 weight percent of the structure or composition for which the component is referenced to. Typically, "substantially free" means that the component described as such is not present.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is L1. to 2.1 the following numbers 1.2, 1.3, 1.4, 1.5, 1.6, 1.7, 1.8, 1.9, and 2.0 can be selected as lower or upper limits. In the specific examples set forth herein, concentrations, temperature, and reaction conditions (e.g., pressure) eau be practiced with plus or minus 50 percent of the values indicated rounded to three significant figures.

In a refinement, concentrations, temperature, and reaction conditions (e.g., pressure) can be practiced with plus or minus 30 percent of the values indicated rounded to three significant figures of the value provided in the examples. In another refinement, concentrations, temperature, and reaction conditions (e.g., pressure) can be practiced with plus or minus 10 percent of the values indicated rounded to three significant figures of the value provided in the examples.

Throughout this application, where publications are referenced, the disclosures of these publications in their entireties are hereby incorporated by reference into this application to more fully describe the state of the art to which this invention pertains.

The term "nano" as used herein refers to particles or structures having at least one spatial dimension that is less than 100 nanometers.

The term "micro" as used herein refers to particles or structures having at least one spatial dimension between 100 nm and 10 microns.

The term "lithiated transition metal oxides" refers to metal oxide having lithium and a transition metal, Examples of such compounds include, but are not limited to, $LiCoO_2$, $LiFePO_4$, $LiNiCoAlO_2$, $LiNiMnCoO_2$, $LiMn_2O_4$, $LiNi_xMn_xO_4$, and $Li_4Ti_5O_{12}$ (LTO).

The term "lithium intercalation material" refers to materials that allow the movement of lithium ions into and out of. In a refinement, the lithium intercalation material is a lithiated transition metal oxide.

Abbreviations

"LCO" means lithiated cobalt oxide.
"LiTFSI" means lithium bis(trilluorodimethane)sulfonimide.
"LLTO" means lithium lanthanum titanate.
"LLZO" means $Li_7La_3Zr_2O_{12}$.
"LTO" means $Li_4Ti_5O_{12}$.
"MCM" means mixed conduction membrane.
"NMP" means N-methyl-2-pyrrolidone.
"PEO" means poly (ethylene oxide).
"PVDF" means polyvinylidene fluoride.

Figure 3A:
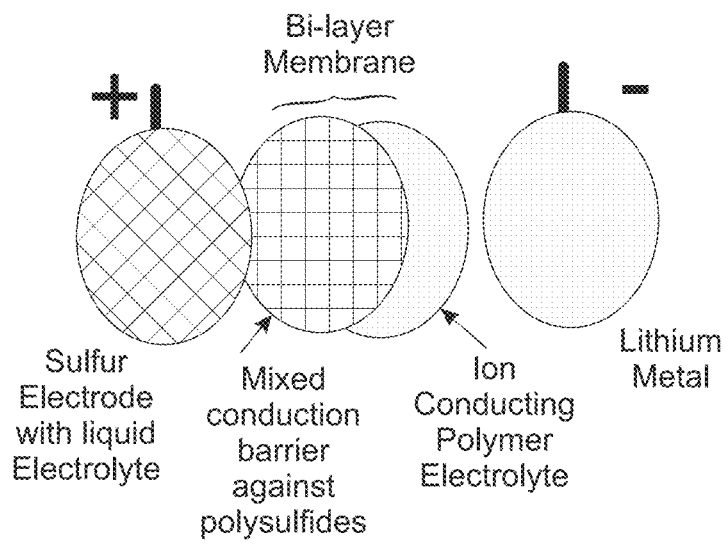
FIG. 3A. Lithium-Sulfur Battery with Bi-layer Membrane Electrolyte
Figure 3B:
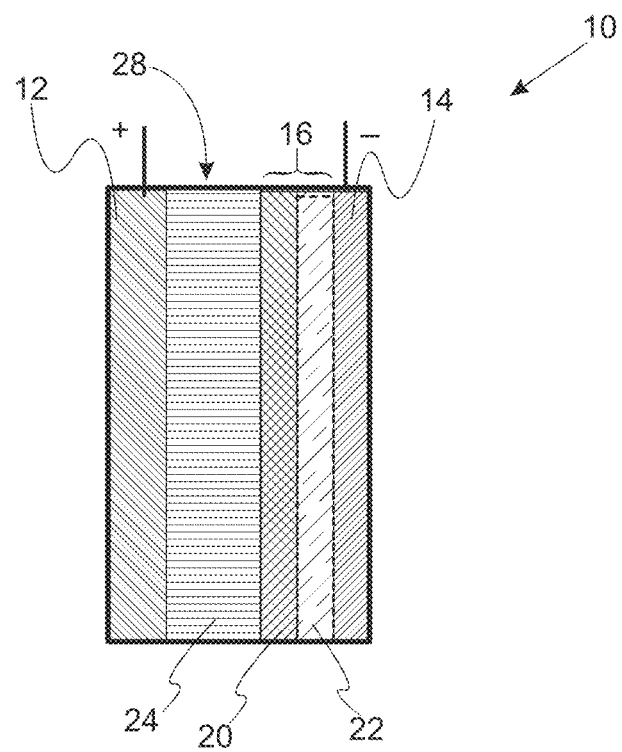
FIG. 3B. Schematic of a Lithium-Sulfur Battery with Bi-layer Membrane Electrolyte.

With reference to FIGS. 3A and 3B, idealized schematics of a lithium-sulfur battery cell having a bilayer membrane are provided. Lithium-sulfur cell 10 includes cathode 12 and anode 14. Bilayer membrane 16 is interposed between cathode 12 and anode 14. Bilayer membrane 16 is interposed between cathode 12 and anode 14. Characteristically, bilayer membrane 16 includes a mixed conduction membrane layer 20 and a lithium ion-conducting layer 22. Details for mixed conduction membrane layer 20 and a lithium ion-conducting layer 22 are set forth below. The main differences mixed conduction membrane layer 20 and a lithium ion-conducting layer 22 is that the mixed conduction membrane layer is an electrical and ionic conductive material that selectively allows the transport of lithium ion by intercalation. In contrast, lithium ion-conducting layer 22 is electrically insulating preventing an electrical short while allowing transport (e.g., migration) lithium ions through the lithium ion-conducting layer. In a refinement, a lithium ion-containing electrolyte is disposed between the cathode and the anode. For example, lithium ion-containing electrolyte can be disposed between bilayer membrane 16 and cathode 12 particularly when a porous separator 24 is used as set forth below. Characteristically, cathode 12 includes sulfur that is optionally dispersed within a polymeric binder (e.g., PVDF). In a refinement, the total sulfur loading in the cathode 12 is form about 1 to 30 mg/cm². Anode 14 includes lithium metal. In in refinement, lithium-sulfur battery cell 10 is substantially free of liquid electrolyte (i.e., it does not includes any lithium ion-containing electrolyte).

As set forth above, bilayer membrane 16 includes a mixed conduction membrane layer 20 and a lithium ion-conducting layer 22. In a refinement, the lithium ion-conducting layer 22 is supported on the mixed conduction membrane layer 20 and therefore, typically adhered to the mixed conduction membrane layer. Characteristically, bilayer membrane 16 is oriented such that lithium ion-conducting layer 22 is interposed between mixed conduction membrane layer 20 and anode 14. In other words, mixed conduction membrane layer 20 faces sulfur cathode 12 and optionally contacts sulfur cathode 12. Additional detail for mixed conduction membrane layer 20 are set forth below.

Referring to FIG. 3B, in a variation, an optional porous separator 24 is positioned in cathode chamber 28 and is interposed between mixed conduction membrane layer 20 and sulfur cathode 12. Therefore, the mixed conduction membrane layer does not contact the cathode in this variation. Porous separator 24 can be formed from any suitable polymer such as polyethylene or polypropylene. In this variation, a lithium ion-containing electrolyte can be disposed between bilayer 16 and cathode 12. Typically, the electrolyte includes a lithium salt (e.g., LiTFSI, $LiPF_6$, or lithium perchlorate) dissolved in a suitable solvent, and in particular an organic solvent (e.g., a mixture of dioxolane and dimethoxyethane).

Figure 4:
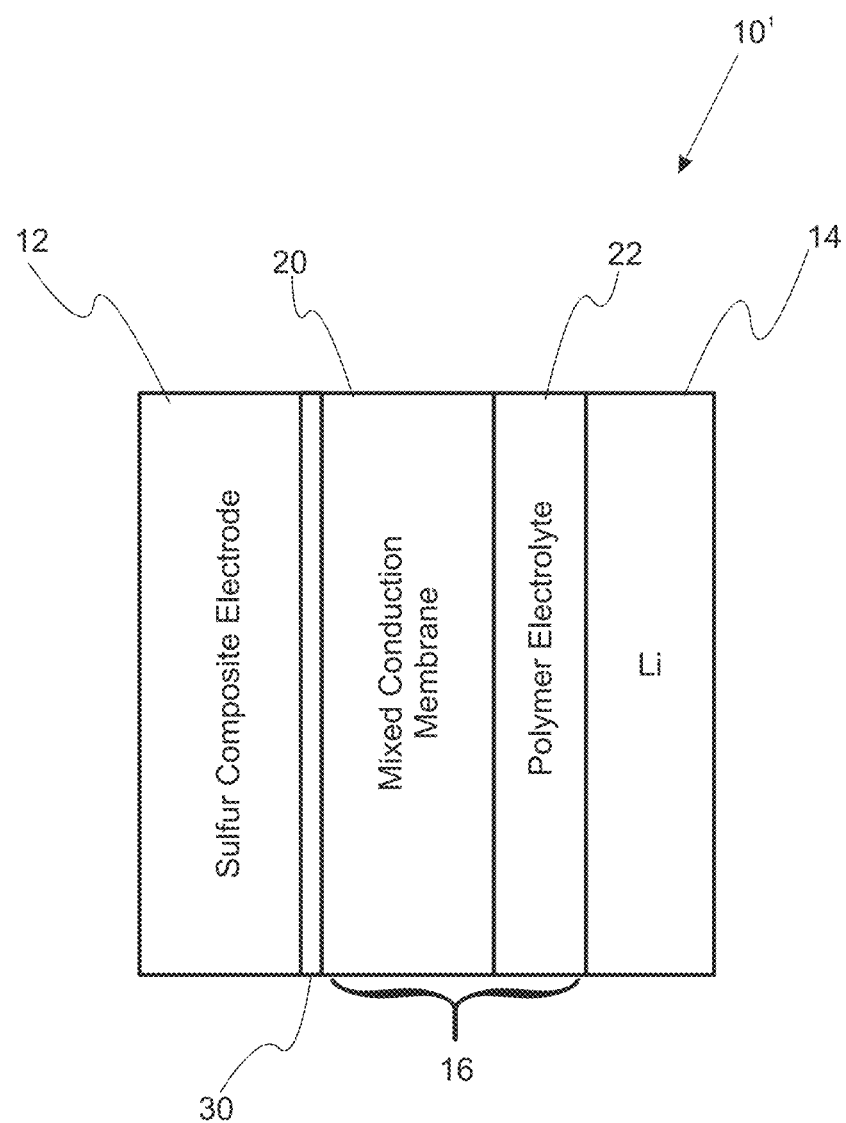
FIG. 4. Schematic of a Lithium-Sulfur Battery with Bi-layer Membrane Electrolyte cathode contacting the MCM.

FIG. 4 provides a schematic illustration of a lithium-sulfur battery cell having a mixed conduction membrane without a separator in the cathode compartment. As set forth above, lithium-sulfur cell $10^1$ includes cathode 12 and anode 14. Bilayer membrane 16 is interposed between cathode 12 and anode 14. In one refinement, cathode 12 includes sulfur that is optionally dispersed within a polymeric binder (e.g., PVDF). In a refinement, the total sulfur loading in the cathode 12 is from about 1 to 30 mg/cm². Anode 14 includes lithium metal. Bilayer membrane 16 includes a mixed conduction membrane layer 20 and a lithium ion-conducting layer 22. Details for mixed conduction membrane layer 20 and a lithium ion-conducting layer 22 are set forth below. Characteristically, bilayer membrane 16 is oriented such that lithium ion-conducting layer 22 is interposed between a mixed conduction membrane layer 20 and anode 14. In a refinement, mixed conduction membrane layer 20 contacts sulfur cathode 12 thereby avoiding the use of separator. In other words, mixed conduction membrane layer 20 contacts and faces cathode 12. Since the mixed conduction membrane layer 20 is electrically conducting, cathode 12 may include another layer 30 on its surface. For example, such a layer 30 can be an insulator such as glass fiber (e.g., about 30 microns) or polypropylene or polyethylene (about 15 microns). In another refinement, layer 30 can be a lithium transition metal oxide (e.g., lithiated cobalt oxide). In this refinement, layer 30 ensures a good electronic contact of the bilayer membrane with the cathode. In a further refinement, layer 30 can be sputtered onto cathode 12. The sputtered layer may be 100 to 1000 nm thick. Advantageously, the design of the present embodiment can be used as a lithium-sulfur solid state battery cell. In a refinement, lithium-sulfur battery cell $10^1$ is substantially free of liquid electrolyte (i.e., it does not includes any lithium ion-containing liquid electrolyte).

Figure 5A:
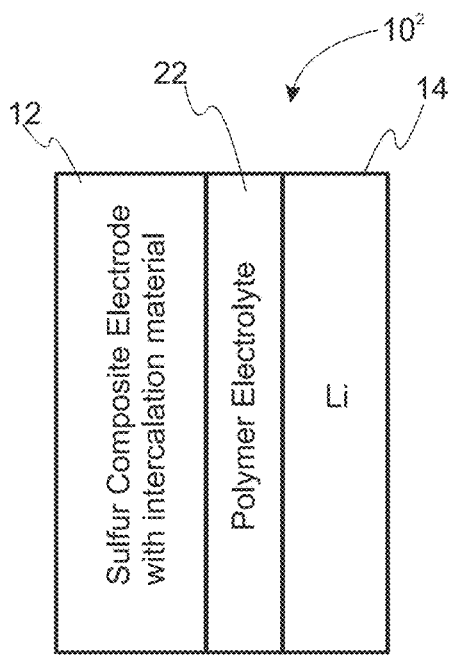
FIG. 5A. Schematic a lithium sulfur battery cell having such a cathode.
Figure 5B:
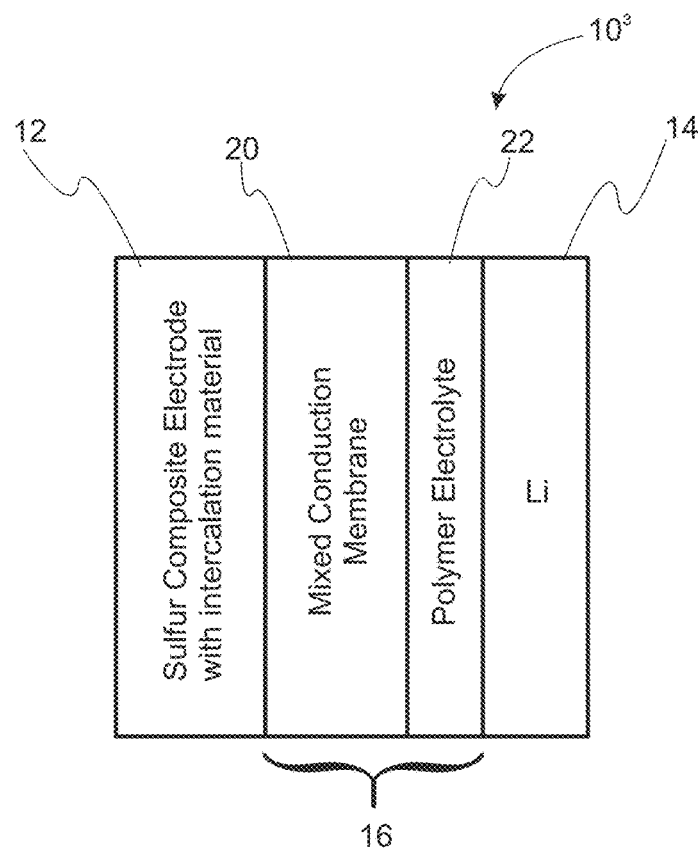
FIG. 5B. Schematic of another variation in which both mixed conduction membrane layer 20 and cathode 12 having particles of a lithium intercalation material dispersed therein.

In another embodiment, a cathode having particles of a lithium intercalation material is used a lithium-sulfur battery cell. FIG. 5A provides a schematic a lithium-sulfur battery cell having such a cathode. Battery $10^2$ includes sulfur cathode 12 having particles of a lithium intercalation material dispersed therein. Lithium ion-conducting layer 22 is disposed between cathode 12 and anode 14. The details of the lithium ion-conducing layer 22 and anode 14 are the same as set forth below. In this variation, the combination of the lithium intercalation particles dispersed in sulfur cathode 12 and the ion conducting layer function in the same manner as the bilayer membrane set forth above. FIG. 5B provides a schematic of another variation in which both mixed conduction membrane layer 20 and cathode 12 having particles of a lithium intercalation material dispersed therein. Battery $10^3$ includes sulfur cathode 12 having lithium intercalation particles dispersed therein. Bilayer membrane 16 is disposed between sulfur cathode 12 and anode 14. As set forth above, bilayer membrane 16 includes a mixed conduction membrane layer 20 and a lithium ion-conducting layer 22. In this variation, mixed conduction membrane 20 faces the sulfur cathode 12. Again, details for mixed conduction membrane layer 20 and a lithium ion-conducting layer 22 are set forth below.

Figure 5C:
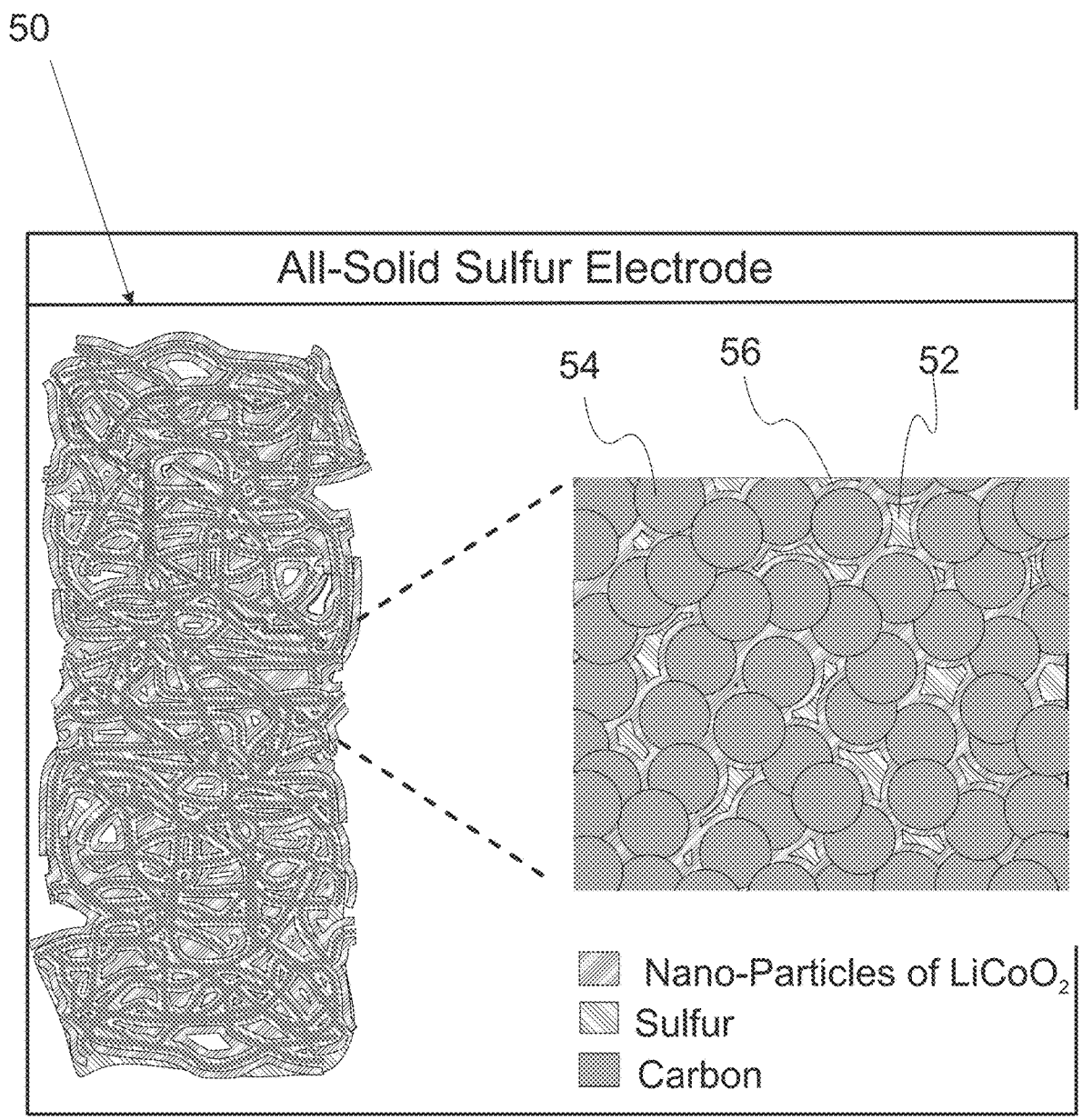
FIG. 5C. Illustration of a cathode for lithium-sulfur batteries having sulfur and lithium-containing nanoparticles.

FIG. 5C provides a schematic illustration of a sulfur cathode that can be used in the variations of FIGS. 5A and 5B. Cathode 50 includes sulfur (melted) 52, carbon particles 54, intercalation nanoparticles or microparticles 56, and a polymeric binder that holds the sulfur, carbon particles, and lithium intercalation nanoparticles and/or microparticles, together. Typically, the carbon particles have a particle size from 20 nm to 10 microns. Examples of polymeric binders includes, but are not limited to, PVDF, Teflon carboxymethyl cellulose (CMC), and the like. Therefore, the cathodes can include lithium intercalation nanoparticles or lithium intercalation microparticles or a combination of lithium intercalation nanoparticles and lithium intercalation microparticles. The lithium intercalation nanoparticles have at least one spatial dimension less than 100 nm while lithium intercalation microparticles have at least one spatial dimension between 100 nm and 10 microns. In a refinement, the lithium intercalation nanoparticles or microparticles are respectively nanoparticles or microparticles of a lithiated transition metal oxide such as $LiCoO_2$, $LiFePO_4$, $LiNiCoAlO_2$, $LiNiMnCoO_2$, $LiMn_2O_4$, $Li_4Ti_5O_{12}$, and combinations thereof. As observed in the figure, at least a portion of the lithium intercalation particles (e.g., the lithium intercalation nanoparticles or microparticles 56) is supported on the carbon particles 54 with at least a portion of the sulfur 52 intercalated within spaces in the network: formed by the carbon particles and supported nanoparticles and/or microparticles. Typically, cathode 50 includes sulfur in an amount from about 30 to 70 weight percent of the combined weight of the sulfur, carbon, lithium intercalation nanoparticles or microparticles, and polymeric binder; carbon in an amount from about 2 to 20 weight percent of the combined weight of the sulfur, carbon, lithium intercalation nanoparticles and/or microparticles, and polymeric binder; lithium intercalation nanoparticles and/or microparticles in an amount from about 10 to 50 weight percent of the combined weight of the sulfur, carbon, lithium intercalation nanoparticles and/or microparticles, and polymeric binder; and polymeric binder in an amount from about 3 to 25 weight percent of the combined weight of the sulfur, carbon, lithium intercalation nanoparticles and/or microparticles, and polymeric binder.

The advantages of mixed conduction membrane layer 20 as used in the battery designs of FIGS. 3A, 3B, 4, 5A, and 5B lies in its ability to exclude the polysulfide ions while maintaining selectively the facile transport of lithium ions using a mixed conduction mechanism. Lithium-ion conduction occurs through the intercalation particles and MCM by electrochemical intercalation or insertion reactions and concomitant solid-state diffusion, exactly as in the cathode of a lithium-ion battery, Because of the rapidity of lithium ion transport in the MCM, the internal resistance of the battery is not higher than that of a conventional lithium-sulfur battery and solid-state lithium-sulfur battery allowing its operation at room temperature.

In a variation of the battery designs of FIGS. 3A, 3B, 4, 5A, and 5B, mixed conduction membrane layer 20 includes a polymeric binder (e.g., PVDF, Teflon, carboxymethyl cellulose (CMC)) and an intercalation material). Therefore, mixed conduction membrane layer 20 is sometimes referred to as a mixed conducting intercalation layer. In a refinement, the lithium intercalation material is a lithiated transition metal oxide. Example of suitable lithiated transition metal oxides include, but are not limited to, $LiCoO_2$, $LiFePO_4$, $LiNiCoAlO_2$, $LiNiMnCoO_2$, $LiMn_2O_4$, $LiNi_xMn_xO_4$, $Li_4Ti_5O_{12}$, and combinations thereof. In a refinement, the lithium intercalation material is present in an amount of about 10 weight % to 50 weight % and polymeric binder in an amount of about 3 weight % to 25 weight % of the total weight of the mixed conduction membrane layer 20. In a further refinement, the lithium intercalation material is nano-sized having at least one spatial dimension from about 10 nm to 100 nm or micron-sized having at least one spatial dimension greater than 100 nm (e.g., one spatial dimension between 100 nm and 10 microns). For example, mixed conduction membrane layer 20 can be a thin non-porous nanocomposite formed by combining the polymeric binder and the lithium intercalation material. In a refinement, mixed conduction membrane layer 20 has a thickness from 15-50 microns. Typically, mixed conduction membrane 20 includes from about 70 to 99 weight percent of the combined weight of the lithium intercalation material and the polymeric binder and from about 1 to 30 weight percent of the combined weight of the lithium intercalation material and the polymeric binder. The mixed conduction membrane layer 20 can be formed from a slurry of lithium intercalation material, carbon (e.g., acetylene black) and polymeric binder in a solvent (e.g., NMP) which is applied to a substrate (e.g., aluminum foil) and then dried.

In a variation, an alternative method for fabricating very thin layers of the mixed conduction membrane layer 20 is provided. In this method, a thin layer of the mixed conduction membrane layer is coated on an aluminum substrate. The mixed conduction membrane layer is released by leaching of the aluminum substrate in strong alkali (e.g., pH 10 to 14). This method allows for mixed conduction membrane layers of 5 microns to 20 microns to be made while still providing the ability to handle the mixed conduction membrane layer. Advantageously, this method provides a reduction of material cost and weight of the mixed conduction membrane layer membrane.

In another variation, mixed conduction membrane layer 20 or a portion thereof is formed by directly sputtering a lithium intercalation material onto the sulfur cathode 12 or onto mixed conduction membrane layer 20 to reduce the interfacial resistance. Examples of such lithium intercalation materials includes, but are not limited to $LiCoO_2$, $LiFePO_4$, $LiNiCoAlO_2$, $LiNiMnCoO_2$, $LiMn_2O_4$, $Li_4Ti_5O_{12}$, and combinations thereof.

It should be appreciated that the polymer electrolyte is required to prevent an internal short between the electrodes. A battery with only the lithium intercalating material is not desired because it is an electronically conductive material. Compared to other solid electrolytes approaches including polymer, using a lithium intercalating material has three mayor advantages: 1) it has a relative rapid ion conductivity 2) is selective towards lithium ion transport exclusively 3) is an electronically conducting material that does not contributes to the cell's resistance. As an example, lithium cobalt oxide ($LiCoO_2$) has an ionic conductivity of is $2\times10^{-3}$ S $cm^{-1}$ a self-diffusion coefficient of $2\times10^{-9}$ $cm^2$ $s^{-1}$ and an electronic conductivity of $1\times10^{-3}$ S $cm^{-1}$. Therefore, the facile diffusion of ions can be mainly attributed to the intercalation reaction and the ion self-diffusion.

Figure 2A:
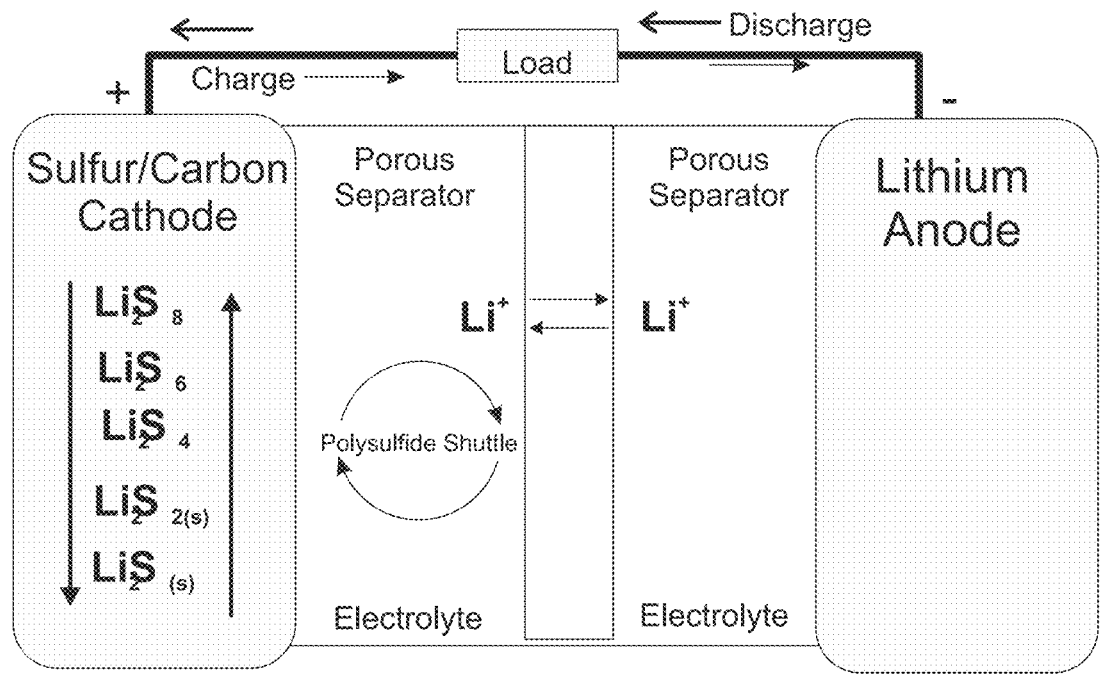
FIG. 2A. Lithium-Sulfur Battery and with an MCM.
Figure 2B:
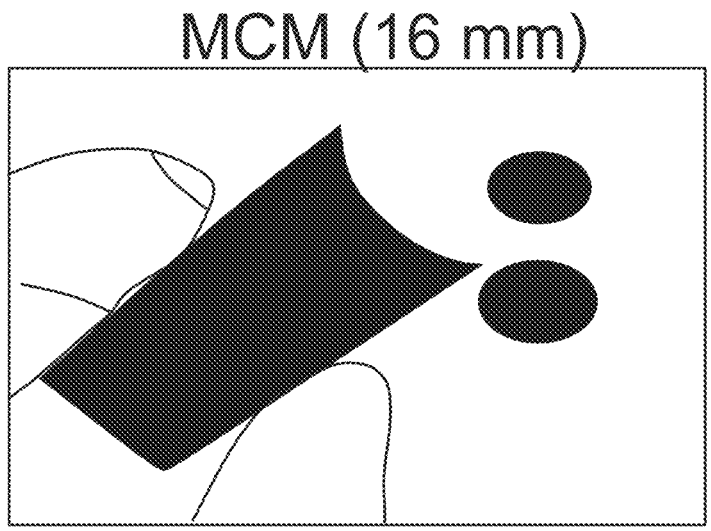
FIG. 2B, Photograph of a flexible MCM (lithiated cobalt oxide) layer for blocking polysulfides.
Figure 2C:
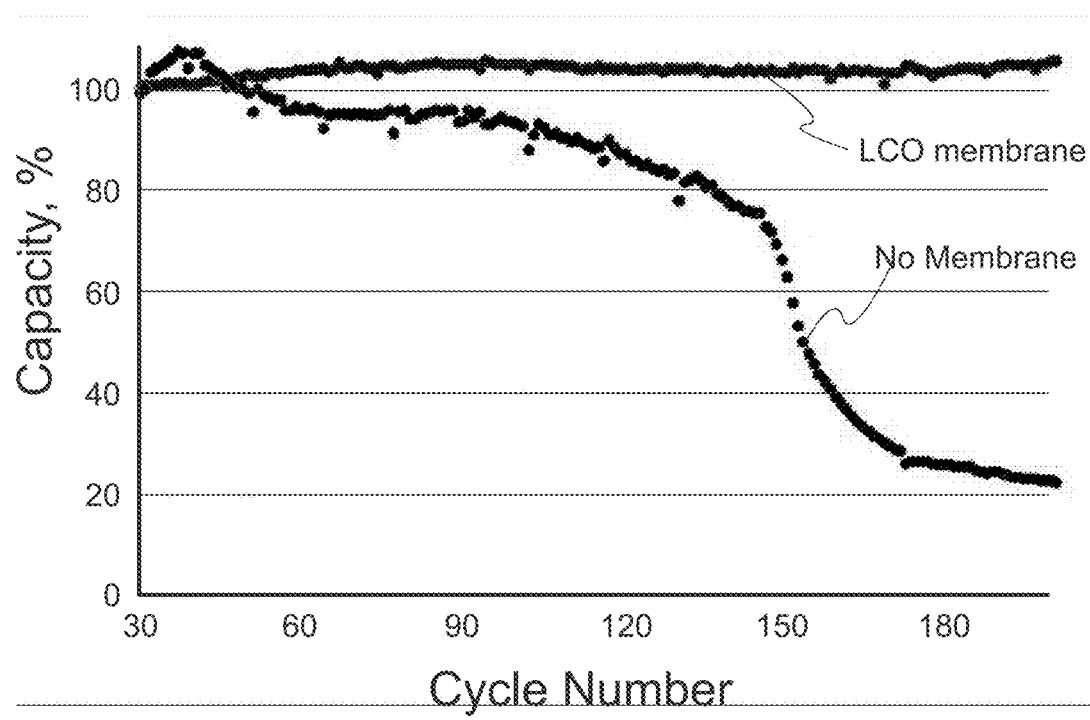
FIG. 2C. Impact of MCM layer on Cycle Life of Lithium-Sulfur Cells

Advantageously, mixed conduction membrane layer 20 enhances the ion transport and does not contribute to the cell's resistance. Moreover, mixed conduction membrane layer 20 provides higher energy efficiency and better rate capability (high power). Mixed conduction membrane layer 20 also serves as a support for fabricating thin layers of lithium ion-conducting layer 22. Advantageously, mixed conduction membrane layer 20 is not used up during cycling and thus provides extended durability and cycle life unlike the case when lithium nitrate is used. The benefits of dense MCM layers including suppression of shuttling of polysulfides, flexibility, improve capacity retention during repeated cycling, and preservation of rate capability and impedance of the lithium-sulfur battery as illustrated in FIGS. 2A, 2B, and 2C is also realized by the embodiments, variations, and refinements set forth herein.

In one variation of the battery designs of FIGS. 3A, 3B, 4, 5A, and 5B, lithium ion-conducting layer 22 is a polymeric ion-conducting layer, and in particular, a polymeric lithium ion-conducting electrolyte (layer). In a refinement, lithium ion-conducting layer 22 (e.g., a polymeric lithium ion-conducting electrolyte layer) has a thickness from about 100 nm to 50 microns, with a thickness of about 30 microns being typical. In this variation, polymeric lithium ion-conducting layer 22 includes a polymeric binder with a lithium salt dispersed throughout the polymeric lithium ion-conducting layer (e.g., in particular the polymeric binder). For the polymeric layer, the molar ratio of polymeric binder to lithium salt is from about 2:1 to about 20:1. In particular, a molar ratio of polymeric binder to lithium salt of about 8:1 is found to be particularly useful. Examples of suitable polymer polymeric binders for lithium ion-conducting layer 22 include, but are not limited to poly(ethylene oxide), poly(vinyl butyral), poly(methyl methacrylate), cross-linked poly(ethylene glycol), PEO-block-poly (N,N-Dimethylactylamide), and combinations thereof. In this regard, poly(ethylene oxide) is found to be particularly useful. Examples of suitable lithium salts for lithium ion-conducting layer 22 include, but are not limited to LiTFSI, $LiPF_6$, $LiClO_4$, etc., and combinations thereof. The lithium ion-conducting layer 22 of this variation can also include various fillers that enhances the ionic conductivity allowing ambient temperature operation, improve mechanical strength, facilitate fabrication and resist dendrite penetration. In a refinement, the amount of filler is from 3% up to 30% of the total weight of lithium ion-conducting layer 22. Examples of useful inorganic fillers include, but are not limited to, $SiO_2$, $Sl_2O_3$, $BaTiO_3$, $TiO_2$, $Al_2O_3$—$SiO_2$, $La_x$-$Li_xTi_xO$ where x is 0.005 to 0.15, lithium-stuffed garnet $Li_7La_3Zr_2O_{12}$ (LLZO), Al-doped LLZO, zirconium oxides-ulfate (Zr—O—$SO_4$), zirconia, and combinations thereof.

In one variation of the battery designs of FIGS. 3A, 3B, 3C, 4, 5A, and 5B, lithium ion-conducting layer 22 includes a lithium oxide-containing ion conductor with or without the polymeric binder as set forth above. Examples of suitable oxides for this variation include, but are not limited to, LLZO ($Li_7La_3Zr_2O_{12}$), LLTO ($Li_{3x}La_{2/3-x}TiO_3$ where x is 0.005 to 0.15), and combinations thereof. Advantageously, this variation provides improved mechanical strength while preventing dendrite growth.

Typically, the cathode 12 set forth above for the battery designs of FIGS. 3A, 3B, 4, 5A, and 5B includes sulfur. In a variation, cathode 12 incudes sulfur, carbon (e.g. carbon particles), and a polymeric binder (e.g., PVDF, Teflon, CMC). Typically, the carbon particle size is from 20 nm to 10 microns. In a refinement, the sulfur is present in an amount from about 10 to 80 weight percent of the total weight of the combination of sulfur, carbon, and polymeric binder. In a further refinement, the carbon is present in an amount from about 10 to 40 weight percent of the total weight of the combination of sulfur, carbon, and polymeric binder. In still a further refinement, the polymeric binder is present in an amount from about 3 to 20 weight percent of the total weight of the combination of sulfur, carbon, and polymeric binder. The cathode can be formed from a slurry of sulfur, carbon (e.g., acetylene black) and polymeric binder in a solvent (e.g., NMP) which is applied to a substrate (e.g., aluminum foil) and then dried.

The following examples illustrate the various embodiments of the present invention. Those skilled in the art will recognize many variations that are within the spirit of the present invention and scope of the claims.

Sulfur Cathode Fabrication

Sulfur (Aldrich, 99.5% purity), Ketjen Black Akzo Nobel EC-600JD), Lithium cobalt oxide powder (Alfa chemistry 99.9% purity, APS<100 nm), and polyvinylidene fluoride (PVDF) binder (MTI) are mixed in with a composition of 43.3%, 16.6%, 33.3%, and 6.6% by weight, respectively, with N-methyl-2-pyrrolidone (NMP) solvent (Aldrich) to form a slurry. The slurry is coated onto an aluminum foil substrate using a doctor blade to a thickness of approximately 15 micrometers. The resulting electrode is dried under vacuum at 70° C. for 8 hours and punched into disks of 16 mm in diameter. The total sulfur loading in the cathode ranged from 1.5 to 2.3 mg/$cm^2$ Layer 1—Fabrication of Mixed Conduction Membrane Layer Lithiated cobalt oxide (MTI, molecular formula LiCoO2) and PVDF is mixed in with a composition of 95% and 5% by weight, respectively, with NMP to form a slurry. The slurry is coated onto an aluminum foil substrate using a doctor blade to a thickness of approximately 30 micrometers and allowed to dry in air. The coated aluminum foil is then hot pressed to 140° C. at pressure of 0.5 kg/$cm^2$ and then dried in a vacuum oven at 70° C. for 8 hours. The coated aluminum toil is punched into disks that were 1.6 mm in diameter and the aluminum foil substrate is subsequently peeled off to yield a freestanding nonporous mixed conduction membrane layer. The total lithiated cobalt oxide loading is approximately 15.5 mg/$cm^2$. In this specific example, the MCM layer is referred to as the LCO membrane, as it is fabricated from lithiated cobalt oxide. The open area for permeation of the LCO membrane was determined to be less than 1% using a permeation cell setup.

Layer 2—Polymeric Electrolyte Layer for Avoiding Liquid Electrolyte at the Anode.

A thin 20-micron polymer electrolyte layer is prepared from polyethylene oxide (PEO) and lithium bis(trifluoromethane)sullonimide (LiTFSI) salt and will be supported on the MCM layer. An effective bilayer membrane is realized by spin coating (or doctor blade) of a layer of PEO-LiTFSI on the MCM. Earlier attempts to use PEO-LiTFSI as an electrolyte have been less successful because the challenges of handling thin free-standing (unsupported) layers of the polymeric electrolyte. This problem can be overcome by supporting the PEO-LiTFSI electrolyte on the MCM membrane leading to a bi-layer membrane concept. While the avoidance of liquid electrolyte will largely curb the formation of lithium dendrites, the inclusion of crystalline solid electrolytes such as $Al_2O_3$, LLZO or the garnet phases in this layer will further increase the resistance to penetration by lithium dendrites.

Results with Li—S Cells with Bi-layer Separator

Cells with a bi-layer membrane consisting of a 30 micron MCM and 20 micron layer of PEO-LiTFSI and sulfur cathode (with a sulfur loading of 43%) has shown a cathode utilization of 1000-1400 mAh/g of sulfur. All the usual features of the voltage profile during charge/discharge are observed in these cells. The coulombic efficiency of these cells was 100%. Also these results have been obtained at 25° C., not usually possible with thick films of PEO.

Figure 6:
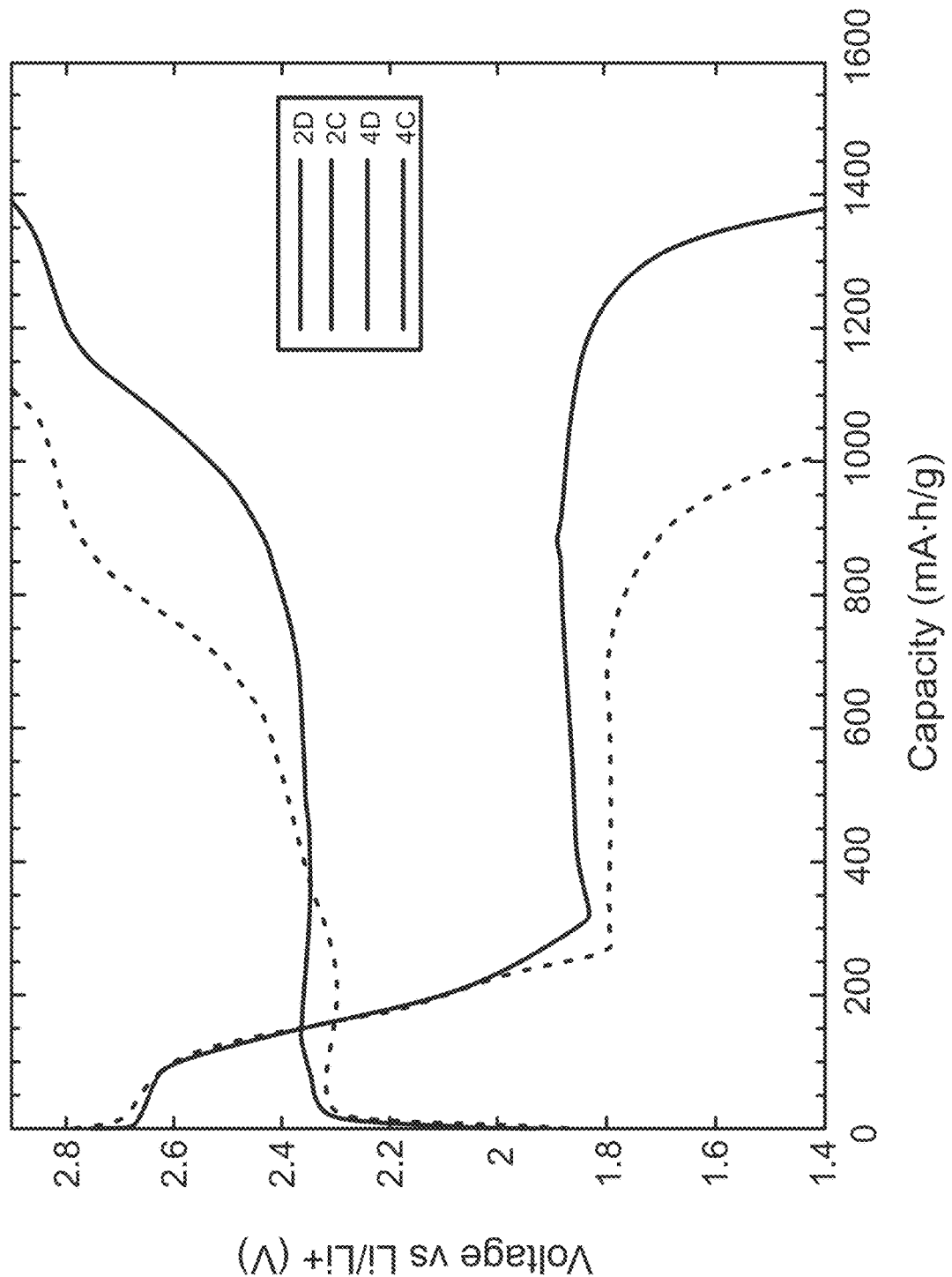
FIG. 6. Galvanostatic charge/discharge curves of the Bilayer Li—S battery for the first and fourth cycle.

FIG. 6 provides galvanostatic charge/discharge curves of the Bilayer Li—S battery for the first and fourth cycle. The cell was discharged at rate of C/20 where 1 C=1675 mA g−1. The sulfur composite electrode composition is: Sulfur (43.3 wt %), $LiCoO_2$ (33.3 wt %), Ketjen Black 600-JD (16.6%), and PVDF binder (6.6 wt %). The Bilayer is made of $LiCoO_2$ membrane coated with a thin layer (≈20 μm) of polyethylene oxide (PEO) mixed with lithium bis(trifluoromethanesulfonyl) imide (LiTFSI). The discharge/charge curves prove the cell's reversibility and that it is rechargeable at room temperature. Moreover, it can deliver at C/20 or 20-hour rate (where 1C1675 mA/g) a competitive specific capacity of almost 1400 mAh/g.

Figure 7:
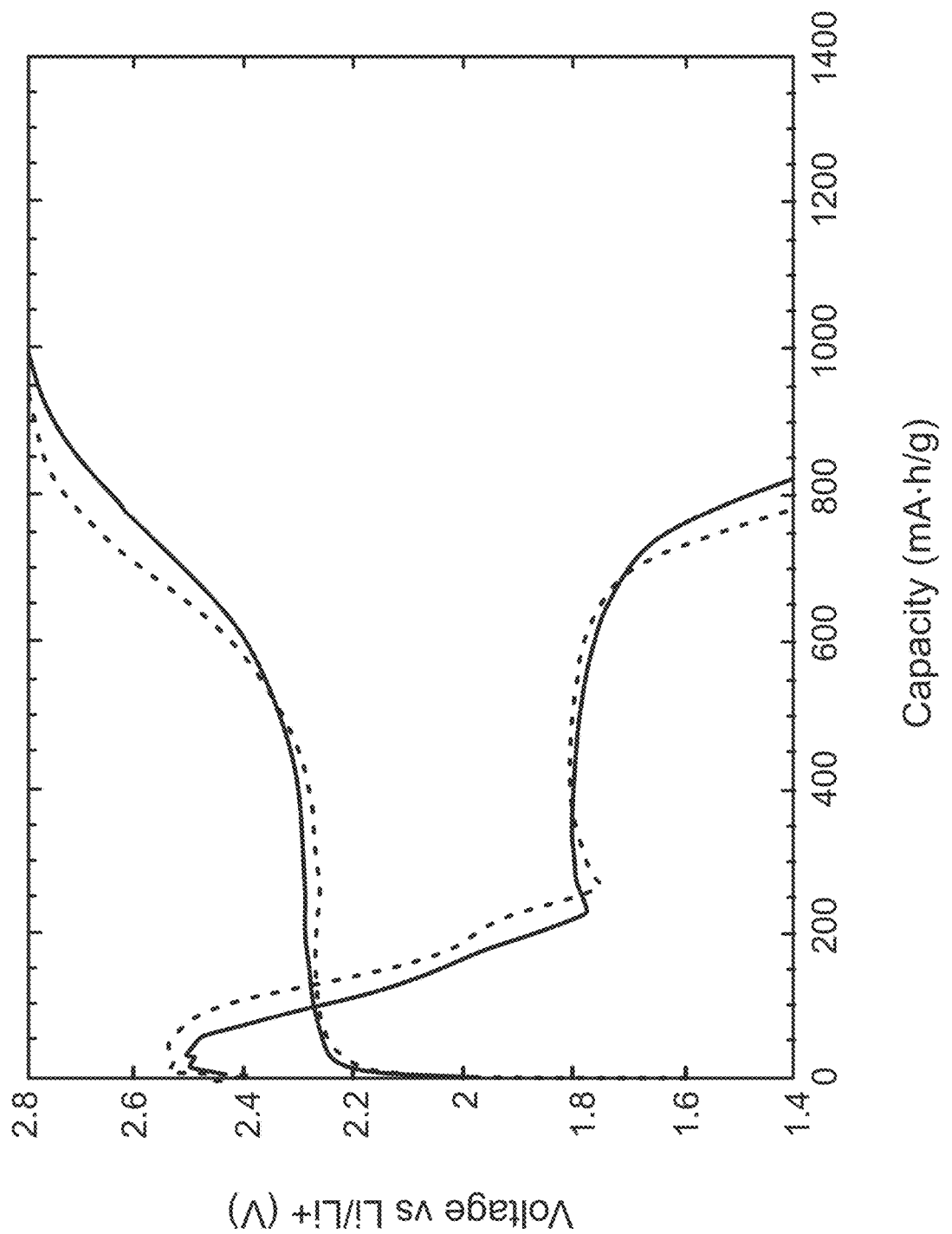
FIG. 7. Galvanostatic charge/discharge curves of the Bilayer Li—S battery for the first and second cycle.

FIG. 7 provides galvanostatic charge/discharge curves of the Bilayer Li—S battery for the first and second cycle. The cell was discharged at rate of C/8 where 1 C=1675 mA g−1. The sulfur composite electrode composition is: Sulfur (43.3 wt %), $LiCoO_2$ (33.3 wt %), Ketjen Black 600-JD (16.6%), and PVDF binder (6.6 wt %). The Bilayer is made of $LiCoO_2$ membrane coated with a thin layer (≈20 μm) of polyethylene oxide (PEO) mixed with bis(trifluoromethanesulfonyl) imide (LiTFSI). The discharge/charge curves prove the cell's rechargeability and that it is working at room temperature even at higher rate C/8 or 8-hour rate (where 1 C=1675 mA/g). It delivers a competitive specific capacity of almost 800 mAh/g.

Figure 8:
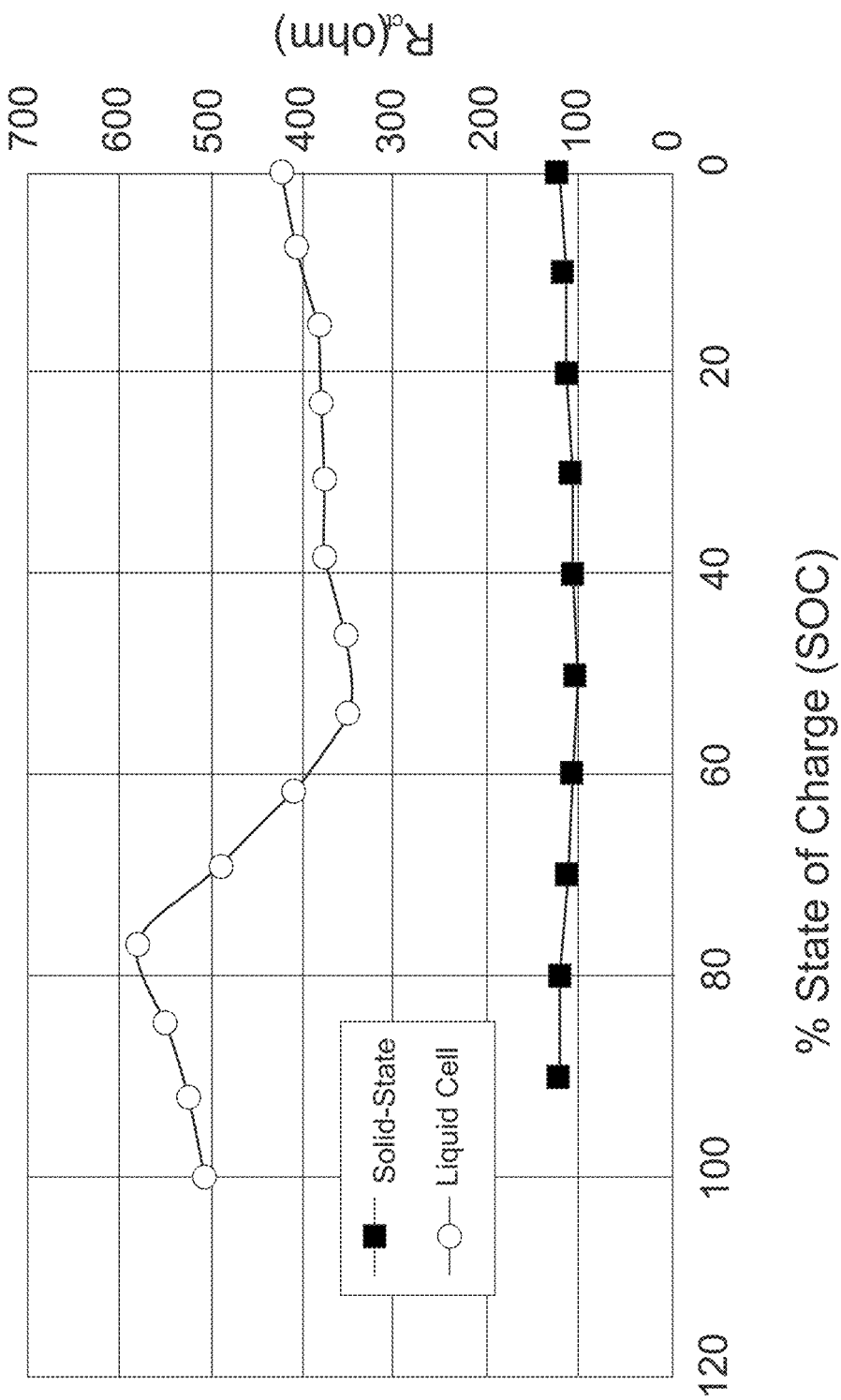
FIG. 8. Charge transfer resistance as function of the state of charge for the Bilayer Li—S battery (with circle markers) and for a standard liquid Li—S battery (with square markers).

FIG. 8 provides charge transfer resistance as function of the state of charge for the Bilayer Li—S battery (depicted with circle markers) and for a standard liquid Li—S battery (depicted with square markers). From this chart we can observe a lower charge transfer resistance compared to a liquid cell, proving that the bilayer does not add to the cell's overall resistance and does not reduce the energy efficiency of the cell.

Figure 9:
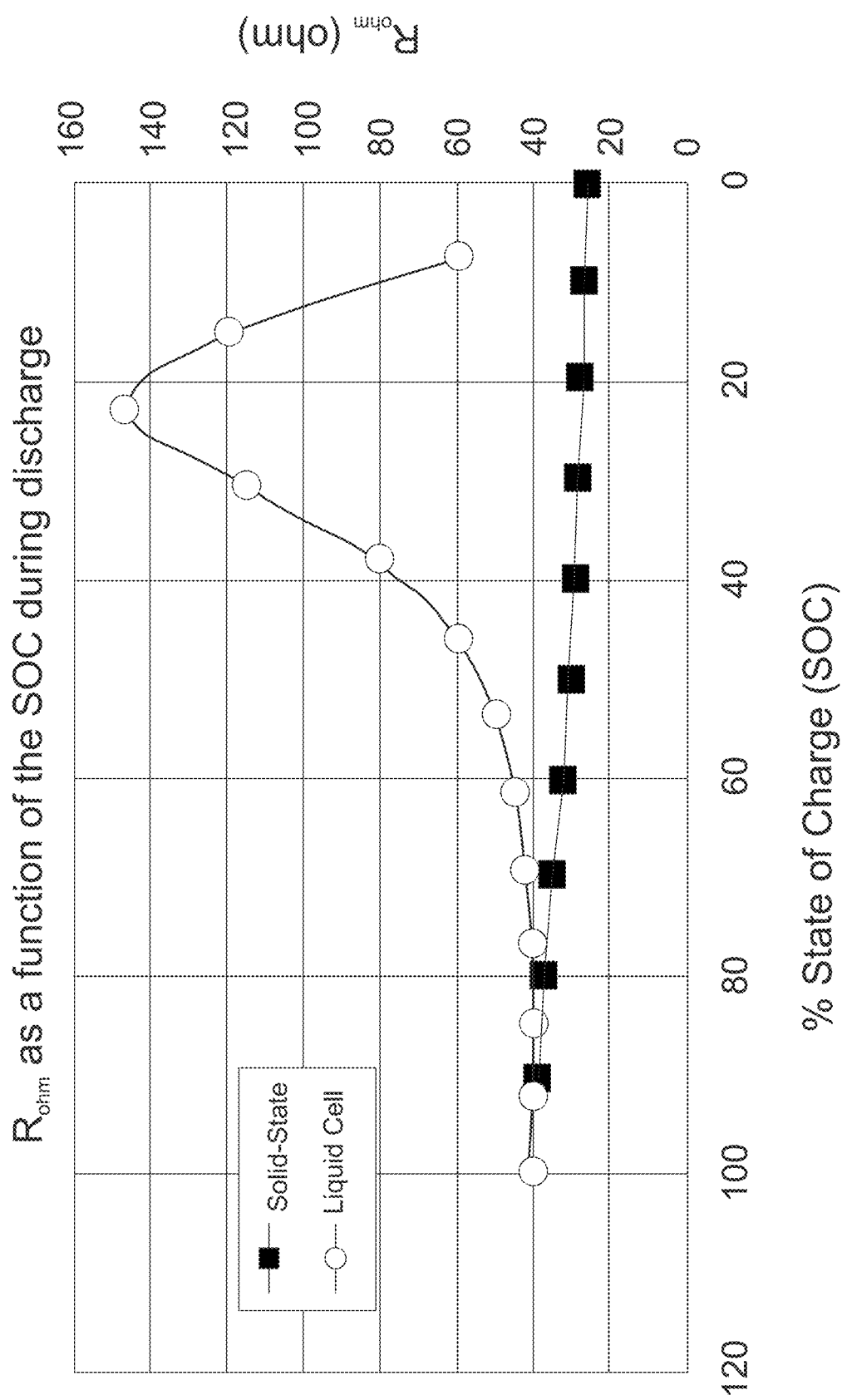
FIG. 9. Ohmic resistance as function of the state of charge for the Bi layer Li—S battery (with circle markers) and for a standard liquid Li—S battery (with square markers).

FIG. 9 provides ohmic resistance as function of the state of charge for the Bilayer Li—S battery (depicted with circle markers) and for a standard liquid Li—S battery (depicted with square markers). From this chart we can observe a lower ohmic resistances compared to a liquid cell. Therefore, the bilayer does not add to the cell's overall resistance and does not reduce the cell's energy efficiency.

Solution of Lithium Sulfur Battery Issues

The bi-layer membrane offers an effective solution to the major challenges faced with the commercialization of lithium-sulfur batteries (Table 1).

| Previous and Proposed Approaches | Requirements of Lithium-Sulfur Cell | | | | |
|---|---|---|---|---|---|
| | Lithium-Ion Selectivity | Ease of Cell Fabrication | Cost Effectiveness | Long Cycle life | Avoids Lithium Dendrites |
| Porous barrier layers | No | Yes | Yes | No | No |
| Lithium Nitrate Additive to Electrolyte | Yes | Yes | Yes | No | No |
| Ceramic/glassy conductors as separator | Yes | No | May be | Yes | Yes |
| Bi-Layer Membrane Concept | Yes | Yes | Yes | Yes | Yes |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCE

1. Moy, Derek, and S. R. Narayanan. "Mixed conduction membranes suppress the polysulfide shuttle in lithium-sulfur batteries." J. Electrochem Soc., 164, A560 (2017).

What is claimed is:

1. A lithium-sulfur battery cell comprising:
    a cathode that includes sulfur;
    an anode that includes lithium metal; and
    a bilayer membrane interposed between the cathode and the anode, the bilayer membrane including a mixed conduction membrane layer and a lithium ion-conducting layer, the lithium ion-conducting layer being interposed between the mixed conduction membrane layer and the anode, wherein the lithium-sulfur battery cell is substantially free of liquid-electrolyte, wherein the mixed conduction membrane layer is an electrical and ionic conductive material that selectively allows transport of lithium ions by intercalation, wherein the mixed conduction membrane layer includes a polymeric binder and a lithium intercalation material dispersed therein, wherein the lithium intercalation material is nanosized having at least one spatial dimension from about 10 nm to 100 nm or micron-sized having at least one spatial dimension between 100 nm and 10 microns, wherein the lithium intercalation material is a lithium transition metal oxide, and wherein the lithium transition metal oxide includes a compound selected from the group consisting of $LiCoO_2$, $LiFePO_4$, $LiNiCoAlO_2$, $LiNiMnCoO_2$, $LiMn_2O_4$, $Li_4Ti_5O_{12}$, and combinations thereof.

2. The lithium-sulfur battery cell of claim 1 wherein the lithium ion-conducting layer is a polymeric lithium ion-conducting electrolyte composed of a polymeric binder with a lithium salt dispersed throughout the polymeric lithium ion-conducting electrolyte.

3. The lithium-sulfur battery cell of claim 2 wherein the lithium salt is bis(trifluorodimethane) sulfonimide, $LiPF_6$, or lithium perchlorate).

4. The lithium-sulfur battery cell of claim 2, wherein the polymeric lithium ion-conducting electrolyte is selected from the group consisting of poly(ethylene oxide), poly (vinyl butyral), poly(methyl methacrylate), cross-linked poly(ethylene glycol), PEO-block-poly(N,N-Dimethylacrylamide), and combinations thereof.

5. The lithium-sulfur battery cell of claim 1 wherein the lithium ion-conducting layer includes a lithium oxide-containing ion conductor with or without a polymeric electrolyte.

6. The lithium-sulfur battery cell of claim 5 wherein the lithium oxide-containing ion conductor is selected from the group consisting of $Li_7La_3Zr_2O_{12}$, $Li_{3x}La_{2/3-x}TiO_3$ where x is 0.005 to 0.15, and combinations thereof.

7. The lithium-sulfur battery cell of claim 1 wherein the mixed conduction membrane layer contacts the cathode.

8. The lithium-sulfur battery cell of claim 7 wherein the lithium-sulfur battery cell is a solid state battery cell.

9. The lithium-sulfur battery cell of claim 1 wherein mixed conduction membrane layer has a thickness from 15 to 50 microns.

10. The lithium-sulfur battery cell of claim 1 wherein the mixed conduction membrane layer includes nanoparticles of the lithium intercalation material.

11. The lithium-sulfur battery cell of claim 1 wherein the cathode further includes carbon and a polymeric binder.

\* \* \* \* \*